Dec. 6, 1927.

J. T. BEECHLYN 1,651,574

OPTICAL PROJECTION

Filed April 13, 1923

Inventor
John T Beechlyn
by
Owen W. Kennedy
Atty

Patented Dec. 6, 1927.

1,651,574

UNITED STATES PATENT OFFICE.

JOHN T. BEECHLYN, OF WORCESTER, MASSACHUSETTS.

OPTICAL PROJECTION.

Application filed April 13, 1923. Serial No. 631,838.

My invention relates generally to an improvement in the art of optical projection, and more particularly, to the projection of pictures upon a screen, as by the use of a motion picture machine or stereopticon. The object of my invention is to prevent the appearance of distortion that ordinarily occurs in the rendering of a projected image by a plain surface, such as a screen when placed obliquely to the axis of projection.

It is well known that in most theatres, or auditoriums, in which moving picture machines, or other picture projecting apparatus are used, it is generally impracticable to locate the projecting apparatus so that the axis of projection will coincide with the central axis of the screen upon which the pictures are to be projected. As a result of this divergence between the axis of projection and the screen axis, distortions of the screen image will be apparent to an observer located at some distance from the screen, and such distortions are usually of a compound nature and are due both to the obliquity and the divergence of the projected beam.

The distortion due to the first of these factors, namely, obliquity, is a one-dimensional distortion or enlargement appearing as an elongation of the screen image, and when considered alone, such distortion is not very objectionable. The effect of the second factor, namely, divergence, when combined with the effect of obliquity, results in a two-dimensional distortion, which has a very serious effect upon the appearance of the screen image. With no divergence between the axis of projection and the screen axis, the effect of divergence is merely that of uniform enlargement of the screen image, dependent upon the distance of the picture which is being projected from the screen. With divergence between the two axes, as is usually encountered in most theatres, the enlargement of the image is no longer uniform, but will have its greatest value at the portion of the screen that is farthest removed from the projector, and its smallest value at the portions closest to the projector, and it follows that the scale of the screen image at these points is proportionate to their respective distances from the projector. This two-dimensional distortion is most objectionable because it involves an angular displacement of elements throughout the picture, to which the eye is very sensitive, particularly if the displacement is from parallelism or the perpendicular. Since the proper outline of the screen image is ordinarily that of a rectangle, distortion of it will be readily apparent, in that it produces an inverted keystone effect, due to enlargement of the scale toward the lower edge of the picture.

I am aware that various attempts have been made to overcome the two-dimensional distortion of the screen image outline, as for instance, by masking the distorted outline of the image with a black rectangular border on the screen, or by making the aperture of the projector in the form of a keystone, so that the screen image will have the proper rectangular outline. Such expedients as these, however, do not affect the distortions within the picture, and often serve to render such distortions more apparent by contrast. I am also aware that it has heretofore been proposed to reduce the appearance of distortion by the employment of devices affecting the projected beam, or by altering the relation between the projector lens and the film. Such devices however, cannot be effective to eliminate two-dimensional distortion of the screen image caused by the fact that different portions of the screen are at different distances from the projector.

By my invention, I propose to provide an improved method of picture projection, whereby it is possible to obtain obliquely projected screen images free from distortion. My improved method involves the use, in a standard projector, of a film picture which is distorted throughout, the distortion of the film being a reversion of that found in a screen image projected under the same conditions from an ordinary uncorrected film picture. In order that my invention may be more clearly understood, reference will now be had to the accompanying drawings, in which—

Like reference characters refer to like parts in the different figures.

Figure 1:
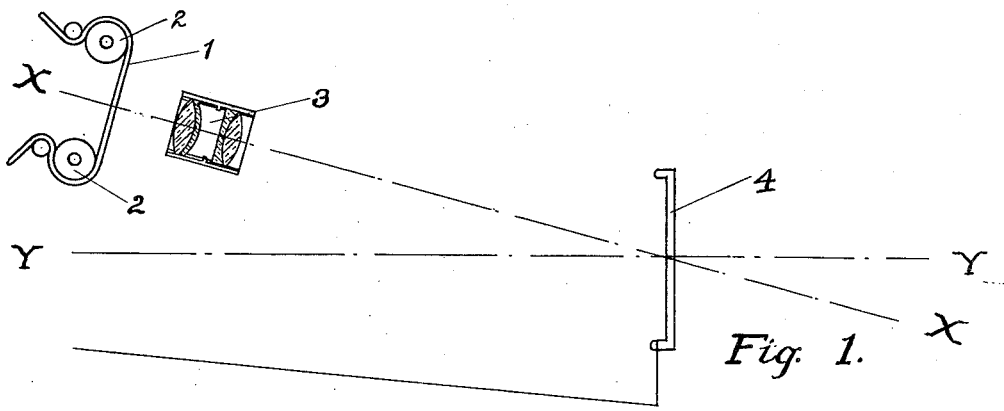
Fig. 1 is a diagrammatic view illustrating the usual arrangement of a projector and screen with the projection axis and the screen axis inclined with respect to each other.

Referring first to the diagrammatic showing of Fig. 1, 1 represents a motion picture film carried upon rollers or sprockets 2, and in front of which is placed an ordinary projection lens 3, whereby an image of a picture on the film 1 may be projected on a screen 4 when a suitable source of light is placed behind the film. It is apparent from an inspection of Fig. 1, that the optical axis X—X of the lens 3 is divergent from the central or normal axis Y—Y of the screen 4, and it is a well known fact that this divergence between the axis of projection and the screen axis is present in almost all motion picture theatres, the angle of divergence being approximately fifteen degrees as an average, and in some places the angle is considerably greater.

Figure 2:
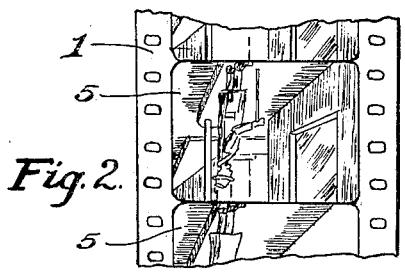
Fig. 2 shows a portion of a motion picture film with a series of uncorrected pictures thereon.
Figure 3:
Fig. 3 shows the distortion of the screen image when the film picture shown in Fig. 2 is projected, as shown in Fig. 1.

In view of the foregoing discussion, it is believed to be apparent that when pictures on the film 1 are projected on the screen 4 with the arrangement shown in Fig. 1, the image on the screen will have a two-dimensional distortion, the extent of which will depend upon the angle of divergence between the axes X—X and Y—Y. For purposes of illustration, I have graphically shown this distortion in Figs. 2 and 3. In Fig. 2, there is represented a portion of the film 1, which is shown as having a number of pictures 5 thereon, each of which is represented by a rectangle, as is usual in motion picture films. In Fig. 3 there is shown the screen 4 on a very much reduced scale as compared to the film 1 as shown in Fig. 2, and the projected image of any one of the pictures 5 is represented by the unshaded portion of the screen. The image is shown as being of a keystone shape, with the base at the bottom of the image, which is the usual form of distortion resulting from the projection of a film picture as shown in Fig. 1. With the image shown in Fig. 3, all portions of the picture will be distorted in two directions, and as has been previously stated, all previous attempts to remedy this distortion by masking the edge of the image, have failed to affect the distortion of parts within the picture itself.

According to my invention, I propose to provide a remedy for screen image distortion by approaching the problem in a radically different manner from the various ways it has been dealt with before. Briefly stated, my invention contemplates the use of a film in the projecting apparatus in which the film pictures have already been distorted to compensate for a predetermined degree of divergence between the axes of projection and of the screen, so that screen images resulting from the projection of such a distorted film with the same degree of divergence, will be without distortion.

Figure 4:
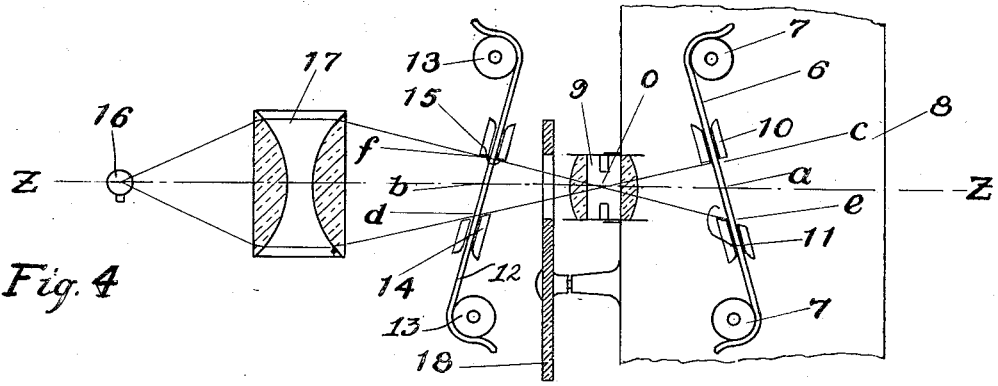
Fig. 4 illustrates a mechanism for producing film pictures corrected to overcome the distortion shown in Fig. 3.

Referring now to Fig. 4, I have shown therein an elementary form of apparatus for photographically producing in a film picture distortions such as are shown in Fig. 3. It is to be understood that the practice of my invention is in no way limited to the use of apparatus such as is shown in Fig. 4, as various other means may be employed for obtaining the same result without departing from my invention.

Referring to Fig. 4, a positive film 6, upon which it is desired to produce the picture distortion, is mounted upon suitable rolls 7 within a light-proof box 8 having an aperture in which is located a photographic lens 9. The film 6 passes through a suitable guide 10 which maintains it in proper relation to the lens, and is provided with an aperture 11 for exposing the desired portion of film for a picture. The guide 10 is so arranged that a line perpendicular to the film 6 makes an angle with the axis of projection Z—Z of the lens 9. A negative film 12 is located outside of the box 8 and passes over rollers 13, suitable means being provided for driving the rolls 13 and 7 in unison, so as to move the films 6 and 12 at the same speed. The film 12 passes through a guide 14 having an aperture 15, and is so arranged that the film 12 is held oppositely inclined from the vertical with respect to the plane at which the film 6 is held by the guide 10. In other words, a line perpendicular to the film 12 makes substantially the same angle with the axis Z—Z as a line perpendicular to the film 6, but the inclination of the film 12 is opposite to that of the film 6.

A suitable light source 16 is provided in front of the film 12, and its rays are collected and directed into the lens 9 by means of a condenser 17. A rotary shutter 18 is provided between the film 12 and the lens 9, the motion of which is timed with relation to the movements of the films 6 and 12, as in an ordinary motion picture camera.

Assuming that the film 12 has a number of pictures thereon, such as might be obtained by exposing it in an ordinary motion picture camera, the operation of the apparatus just described in forming distorted pictures on the positive film 6, will now be discussed. The spacing between the apertures 11 and 15 and the lens 9 is such that the points of intersection $a$ and $b$ of the axis Z—Z with the films 6 and 12, respectively, coincide with the conjugate foci of the lens 9. Consequently, a sharp image of the picture at *b* on the negative film 12 will be formed on the positive film 6 at *a*. If some other point on the positive film 12 is now considered, such as a point *c*, it will substantially coincide with the conjugate focus of a point *d* on the negative film 12, where the negative film surface is intersected by a line drawn from the point *c* through the optical center 0 of the lens 9. Thus the negative picture at *c* will be a well defined image of the positive picture at *d* on the opposite side of the axis Z—Z. Similarly, a sharp image will be produced at a point *e* on the film 6, since this point substantially coincides with the conjugate focus of a point *f* located on the negative film 12 at the intersection of a line drawn from the point *e* through the optical center 0 with the film 12. Since the same relation holds true for any corresponding two points on the respective film surfaces, it is evident that the portion of the positive film 6 exposed through the aperture 11, will contain a sharp image of the negative picture visible through the aperture 15.

Figure 5:
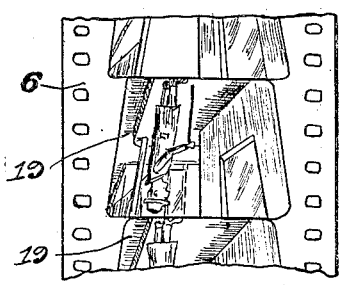
Fig. 5 shows a portion of a motion picture film with a series of corrected film pictures thereon.

If we now consider the relative scale of the picture and image through the apertures 11 and 15, it will be evident that the scale of the picture at the point *a* on the positive film 6 will have the same scale as the picture at the point *b* on the negative film, if these points are chosen equidistant from the optical center 0 of the lens 9. The point *c* however, on the positive film, is relatively closer to the lens 9 than the corresponding point *d* on the negative film, and consequently the projected image of the picture at *c* will be of smaller scale than the picture at *d*. Conversely, the picture image at the point *e* will be of a larger scale than the picture at the point *f*, inasmuch as the point *e* is farther from the lens 9 and the point *f*. From the foregoing, it follows that other points of the picture on the positive film 6, intermediate the points *e* and *c*, will vary in their diminution or enlargement of scale in accordance with the distance at which such points are removed from the optical center 0 of the lens 9. If, therefore, the pictures on the negative film 12 are of the same scale throughout, as are the pictures of the film shown in Fig. 2, then projected picture images on the positive film 6 will show a progressive two-dimensional change of scale throughout, and will appear as shown in Fig. 5. The distorted pictures on the film 6 are indicated at 19 in Fig. 5, and are shown as being keystone shape in order to illustrate the distortion.

Figure 6:
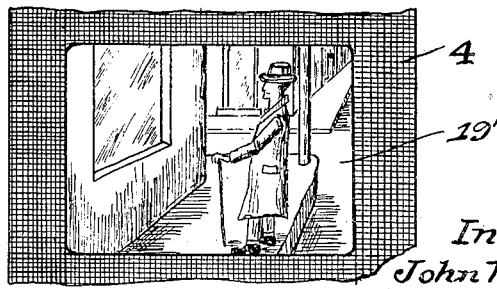
Fig. 6 shows the projected image obtained by projecting the corrected film shown in Fig. 5, in the manner shown in Fig. 1.

If the positive film 6 is now substituted for the film 1 in the projection apparatus shown in Fig. 1, the projected image of any one of the film pictures 19 on the screen 4 will be as shown at 19′ in Fig. 6, or in other words, the screen image will be substantially without appreciable distortion.

In the foregoing discussion, it has been assumed that in the apparatus shown in Fig. 4, the angle which the axis Z—Z makes with lines perpendicular with the respective film surfaces, is the same as the angle of divergence between the axes X—X and Y—Y of Fig. 1. Therefore, in order to completely correct image distortion which might occur with other angles of divergence, it will only be necessary to change the inclination of the guides 10 and 14 accordingly. In the event that the various angles of divergence for a large number of motion picture theatres are nearly the same, as has been found to be the case, it will readily be seen that positive films corrected for the average angle of divergence, could be exhibited in any one of these theatres without apparent distortion of the screen image. In addition, my method can be applied to meet special conditions in a particular motion picture theatre, since it is evident that a perfect screen picture can be obtained for almost any condition of extreme obliquity and divergence by proper correction of the film. In this way it will be possible to locate a projector at any point in the theatre that, for special reasons, might be considered advantageous.

From the foregoing, it is apparent that by my invention I have provided an improvement in the art of optical projection, whereby the display of motion pictures on a screen may be greatly improved. My invention can be put into practice without necessitating any changes in the standard equipment usually found in motion picture theatres, since films corrected by my method are entirely interchangeable with the present standard films and require no change in the projection apparatus for their use. The only changes, or new apparatus, involved in carrying out my invention occur in the producing laboratory, where the films corrected for the average conditions of divergence can be readily obtained from the original uncorrected films. It is evident that the proposed method of printing a corrected film may be limited to the production of a single corrected master film, from which any number of films for distribution can be made in the customary manner by contact printing.

The application of my invention is in no way limited to the exhibition of motion picture films, as it obviously may also be applied to the exhibition of stereopticon views, in which slides are used instead of continuous films. By using a corrected picture slide, it would be easily possible to have the projector located at a point very near the screen in front of the audience, and in this way the confusion that often results when a projector is located at a considerable distance from a lecturer may be eliminated.

While I have shown my invention as being carried out by the employment of a particular type of apparatus for producing corrected film, it is not so limited, but is capable of various modifications within the scope of the appended claim.

I claim,

In a device for motion picture projection, the combination with a screen and a projector having its axis of projection upwardly inclined at a fixed angle with respect to the normal axis of said screen, of a film for said projector providing a series of pictures, each of which has a progressive increase of scale from the bottom so as to correct in the projected screen image the progressive decrease of scale from the bottom otherwise resulting from the inclination between the projection axis and the screen axis.

Dated this sixth day of April, 1923.

JOHN T. BEECHLYN.